United States Patent [19]
Childs et al.

[11] Patent Number: 5,675,891
[45] Date of Patent: Oct. 14, 1997

[54] METHOD OF INDUCTIVELY SOLDERING ELECTRICAL CONNECTOR ELEMENTS

[75] Inventors: Jonathan Childs, Rochester; Charles R. Schotthoefer, Bloomfield Hills, both of Mich.

[73] Assignee: Cardell Corporation, Rochester Hills, Mich.

[21] Appl. No.: 610,258

[22] Filed: Mar. 4, 1996

Related U.S. Application Data

[62] Division of Ser. No. 372,987, Jan. 17, 1995, Pat. No. 5,519,192.

[51] Int. Cl.⁶ .............................. H01R 43/02; B23P 19/00
[52] U.S. Cl. .......................... 29/879; 29/747; 439/879; 439/891
[58] Field of Search ........................ 29/879, 874, 882, 29/747; 439/879, 891

[56] References Cited

U.S. PATENT DOCUMENTS

| | | |
|---|---|---|
| 3,786,981 | 1/1974 | Davis . |
| 4,050,618 | 9/1977 | Angelucci et al. . |
| 4,246,461 | 1/1981 | Jeppson ........................ 219/633 |
| 4,253,234 | 3/1981 | Niles et al. ................... 439/891 X |
| 4,359,623 | 11/1982 | Fanning . |
| 4,369,572 | 1/1983 | Atkins ........................... 29/879 |
| 4,466,689 | 8/1984 | Davis et al. .................... 29/879 X |
| 4,518,445 | 5/1985 | Pedersen et al. . |
| 4,539,456 | 9/1985 | Mohr ............................. 219/653 |
| 4,558,918 | 12/1985 | Shores ........................... 219/876 |
| 4,596,440 | 6/1986 | Quan .......................... 439/879 X |
| 4,995,838 | 2/1991 | Ayer et al. ..................... 29/860 |
| 5,032,703 | 7/1991 | Henschen et al. ............. 219/616 |
| 5,048,260 | 9/1991 | Raymond et al. ............. 219/633 |
| 5,156,318 | 10/1992 | Suzuki et al. . |
| 5,207,369 | 5/1993 | Haji et al. . |
| 5,211,589 | 5/1993 | McCardell ..................... 439/879 |
| 5,348,498 | 9/1994 | Morello et al. . |

*Primary Examiner*—Carl J. Arbes
*Attorney, Agent, or Firm*—Jones, Tullar & Cooper, P.C.

[57] ABSTRACT

Electrical connector components, for example, a pin terminal constructed from a solid wire pin and a formed metal body, are attached to a web carrier and fed through an inductive heating station, thereby bonding the components together. The components are pre-treated with a conductive bonding material which can be cured, flowed, or set by applying heat. The web carrier may be wound on a first spool, fed through the inductive heating station, and wound onto a second spool, for ready feed to and from successive production steps. The temperature of the heating operation may be controlled by varying the speed of the web feed and the strength of the inductive field, so as to ensure repeatable, uniform heating, at a high economical speed. In addition, the tip of the pin can be cooled during the heating operation, to prevent heat damage or contamination of the pin.

15 Claims, 6 Drawing Sheets

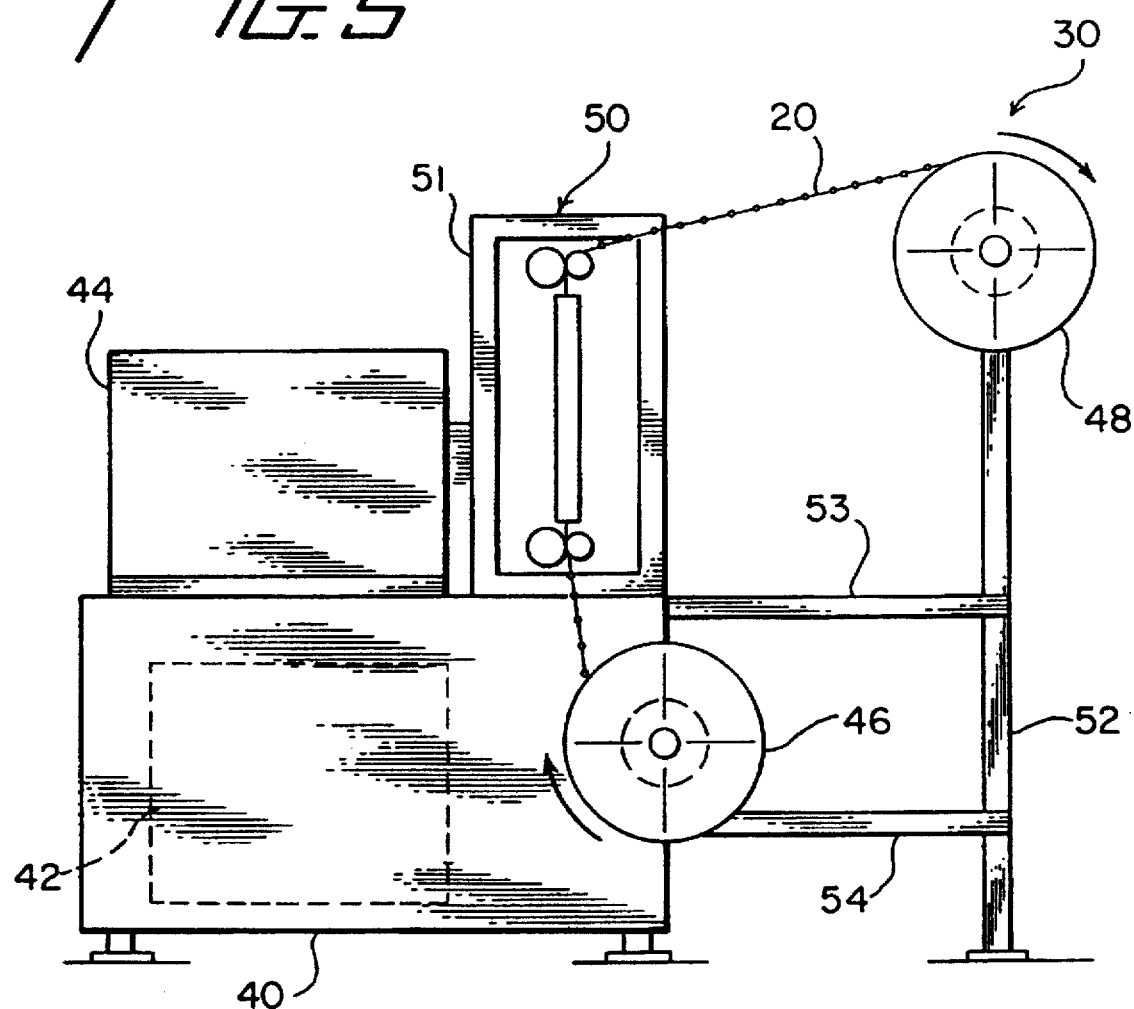
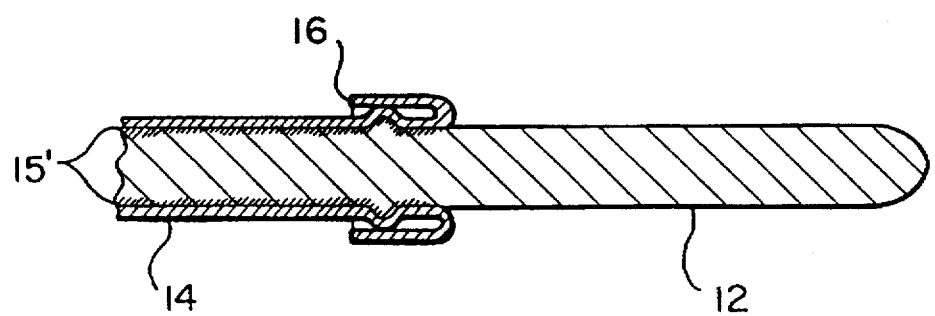

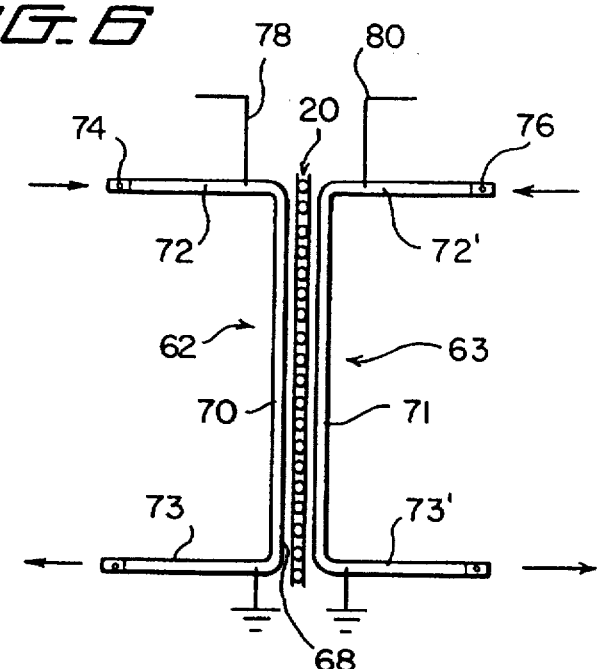
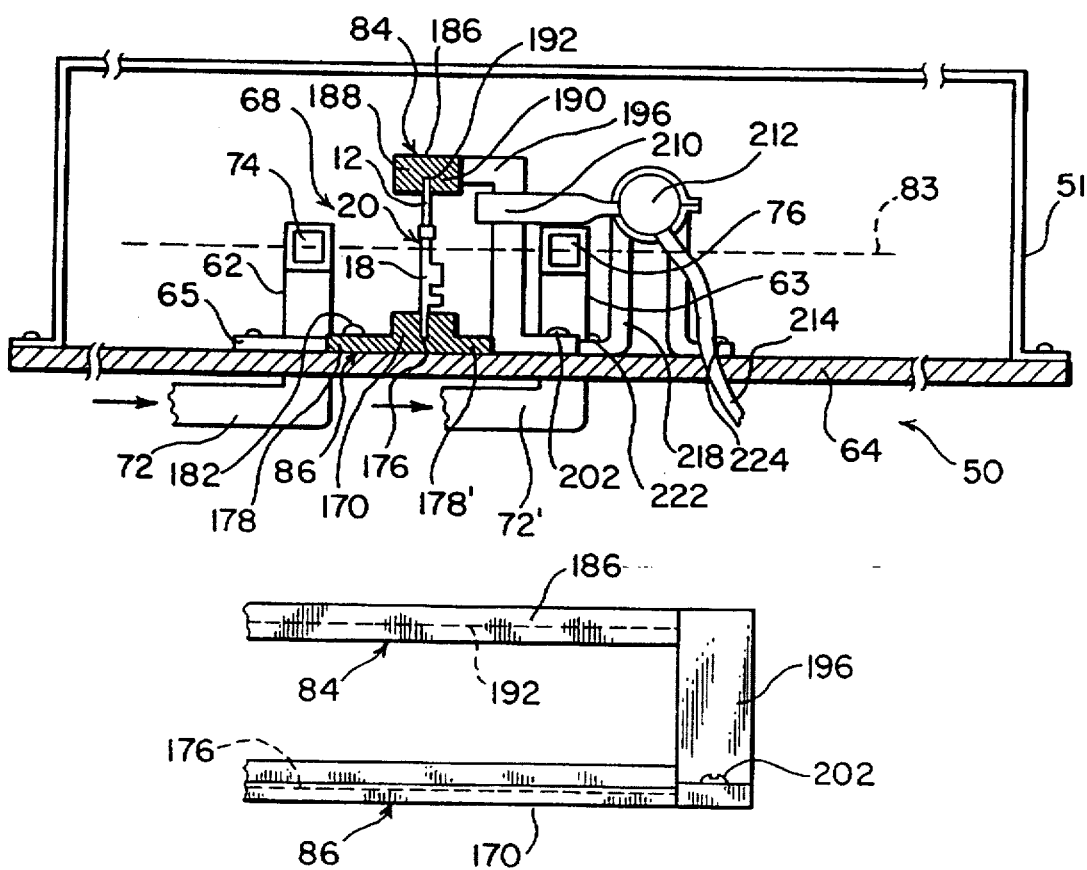

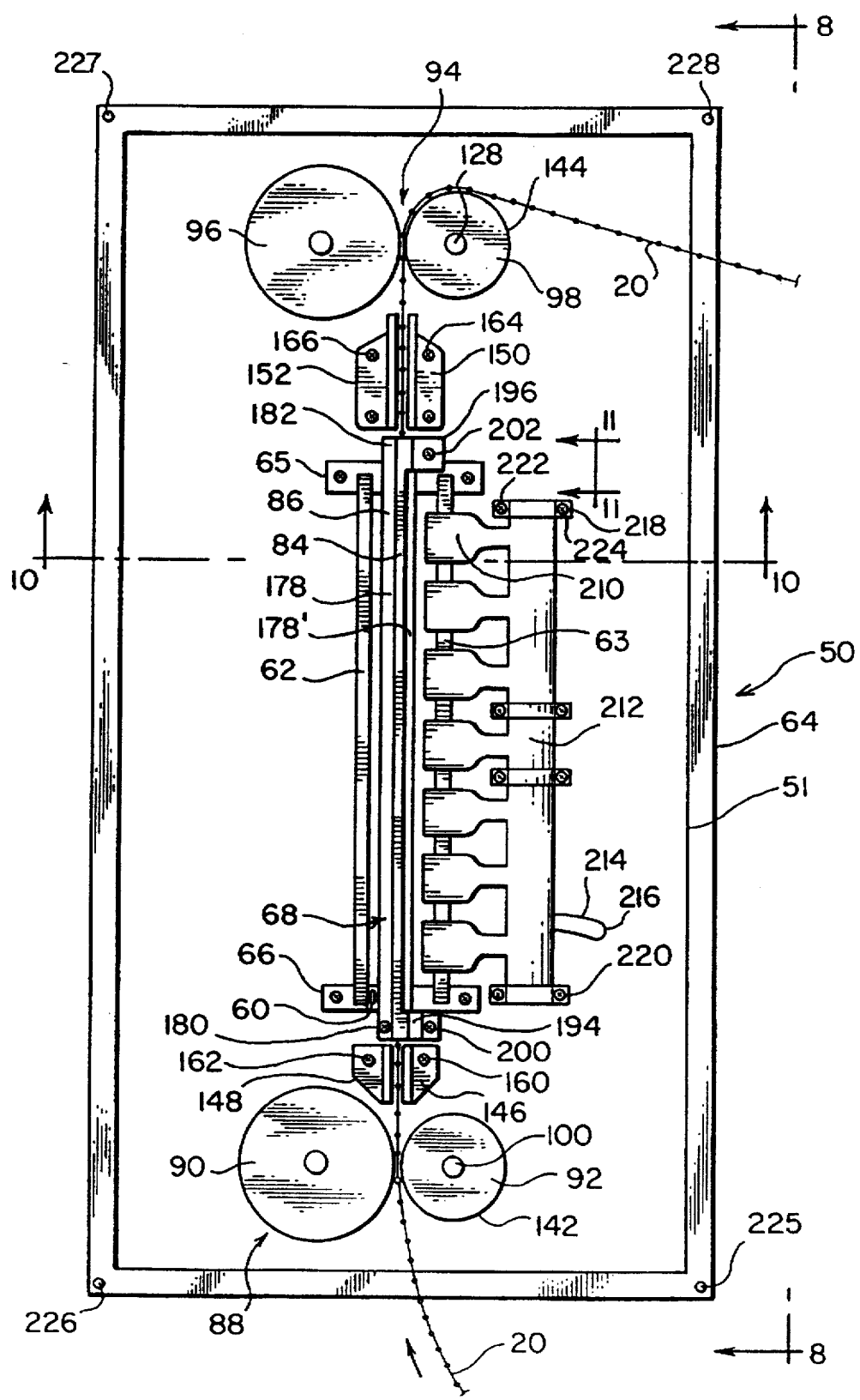

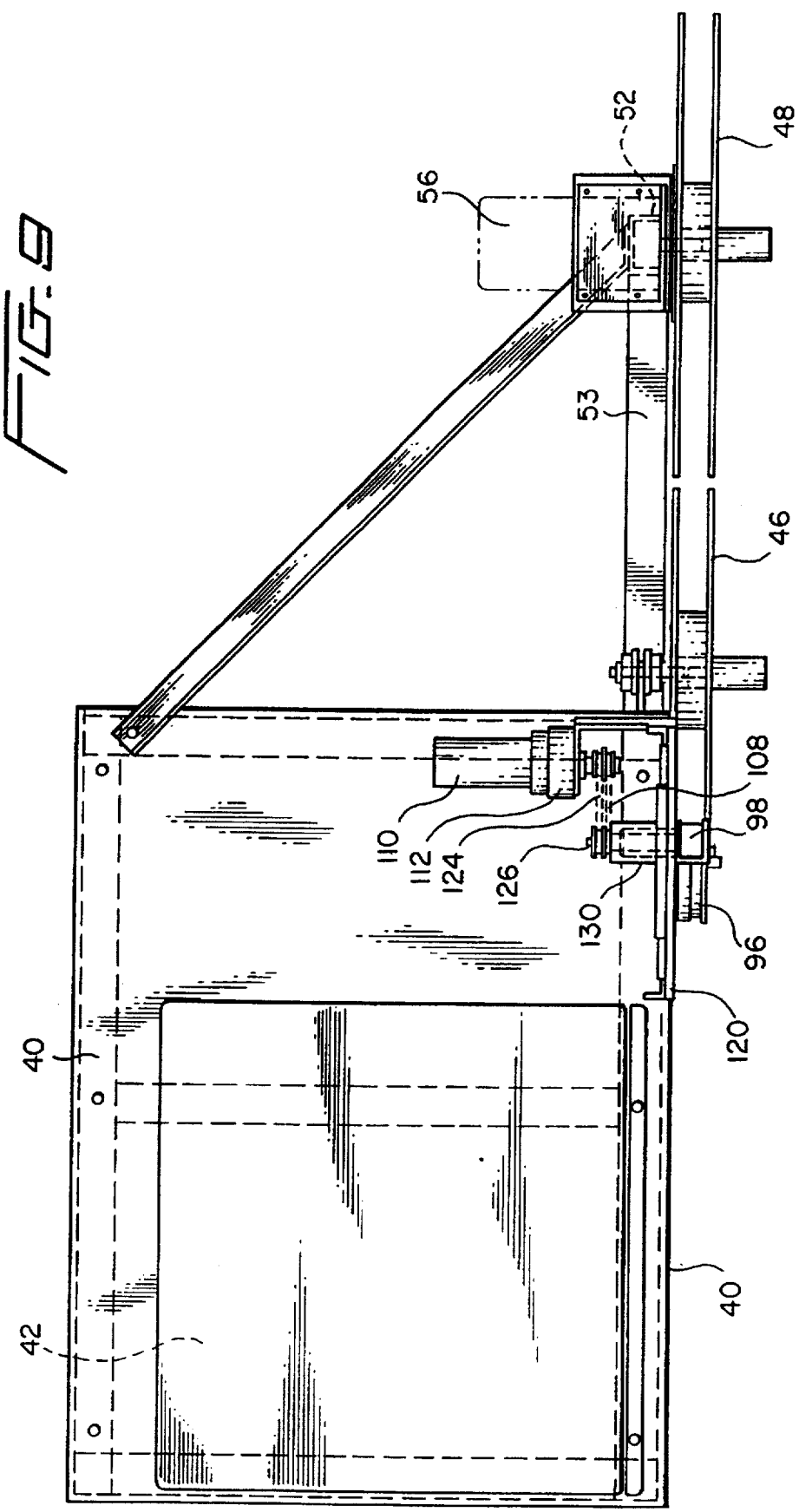

METHOD OF INDUCTIVELY SOLDERING ELECTRICAL CONNECTOR ELEMENTS

This is a divisional of application Ser. No. 08/372,987 filed on Jan. 17, 1995, now U.S. Pat. No. 5,519,192.

BACKGROUND OF THE INVENTION

The present invention relates, in general, to an improved micropin electrical connector system, which incorporates a two-part pin terminal including a pin and a formed metal body, and more particularly to a method and apparatus for fabricating the pin terminal. The pin terminal is used, for example, in conjunction with a two-piece connector system, including a plug component and a socket component, such as that described in prior U.S. Pat. No. 5,211,589, assigned to the assignee of the present application. The plug component is adapted to receive and secure corresponding pin terminals, such as those described in the present application, which terminals may be crimped onto the ends of interconnect wires to facilitate the assembly of wire harnesses, for example. The connector system provides both plug and socket terminations at the ends of such harnesses for in-line connections to corresponding terminations on other harnesses or for header connections to suitable electronic components such as microprocessor control elements, sensors and the like.

The rapid development of electronic systems for a wide range of industrial products and consumer goods has resulted in a heavy demand for improvements in the wire interconnects between electronic control components, the sensor elements connected to various parts of appliances, automobiles, and the like, and the various elements being controlled by such electronic components. These wired interconnects are often in the form of wire harnesses, wherein multiple wires are secured together to provide connections between specified locations and wherein the wires are provided with plug and socket terminations for interconnection with electronic components or other wire harnesses. A typical example of these harnesses and the corresponding plug and socket terminations is found in automotive applications, where increasing numbers of electronic sensors and control systems are being provided, requiring larger quantities of wire interconnects and increasingly complex wiring harnesses to provide the required connections to the various system elements.

The expanding use of wire harnesses and the increasing number of plug and socket terminations for such harnesses has highlighted the problems that have been encountered in prior interconnection systems, for as additional connectors are used, it becomes increasingly important to provide connectors which can be easily connected and disconnected and, even more importantly, can be automatically or manually assembled in harnesses accurately and easily so as to insure reliability while maintaining as low cost as possible. Generally, wiring harnesses utilizing multiple wires connected to the plug and socket components forming the harness terminations have been hand assembled, with individual wires being inserted into corresponding connector locations on both the plug and socket ends of the harness. The assemblers must select specific cables or wires for specific connections in the harness, and must secure them accurately and reliably to the corresponding plug and socket components. The plug and socket components must be constructed so that there is a positive lock for the individual wire terminals not only to retain the wires in place during the assembly process, but to enable the assembler to know that the wire is positively seated in its respective connector components. At the same time, the wires must be removable from the plug or the socket in case an error is made, so as to avoid the need to discard an entire harness if one wire is put in the wrong location. This requires a careful design of both the terminal at the end of the wire and the receiver in the plug or socket component of the connector system so that the wires can be easily handled without tangling and so that the terminals can be inserted into the connector components easily and accurately, while being removable in case errors are made, so as to insure proper positioning for reliable interconnection with, for example, other connector components.

As more wires have been included in harnesses and as connectors have been made smaller, the wire terminals have been forced into close proximity when inserted into connector components, not only making the assembly of a harness more difficult, but also causing significant problems in the manufacture of the connector itself. Thus, the downsizing of the connector system has imposed increasingly high standards for manufacturing tolerances, both for the connector housing portions and for the wire terminals. For example, by increasing the number of wires and often at the same time requiring smaller connectors, the spacing between the wires within the connector of necessity became smaller. The small connector dimensions created serious manufacturing problems, since the connector housings typically are molded from plastic materials, and the tools and dies used to form the connector parts are extremely complex. As the sizes and tolerances became smaller, the difficulty, and expense, of making the molds and maintaining them became excessive. In addition, the use of smaller and therefore more delicate parts made automated assembly of the harnesses very complex.

Yet the demand for smaller connectors with larger numbers of terminals continued, and the demand is still increasing for reductions in connector size as well as reductions in the cost of manufacturing connector housings and wiring harnesses.

The wire terminals utilized on the individual wires used in such harnesses typically have been shaped from sheet metal through a series of precision forming steps which shaped the terminal to form either a pin (male) or a receptacle (female), these terminals being shaped to fit into corresponding connector housing plug and socket portions, respectively, for retention by the methods described in the prior art. However, as the connectors have become miniaturized, it has been necessary to also miniaturize the wire terminals, and serious problems have been encountered in meeting the miniaturization requirements. It has been found, for example, that as pin terminals and receptacle terminals are made smaller, it becomes extremely difficult to maintain proper tolerances that will ensure reliable electrical contact when they are mated with each other or with other electrical components, or to maintain assembly forces within desired ranges. Thus, if the pin portion is too large for the receptacle portion, assembly becomes very difficult; on the other hand, if the pin is too small, then electrical contact is not reliably made. Furthermore, the precision forming steps required to make such terminals caused metal stress and fatigue which often resulted in broken terminals and resultant failure of electrical connections, and produced a seam on the mating surfaces which increased assembly forces and reduced electrical contact. The precision forming of the terminals also resulted in significant scrap metal loss and rounded corners which prevented positive locking action.

Thus, there has been a demand for reductions in the size of electrical connectors and/or an increase in the number of wires carried by such connectors. Further, there is a need for such connectors which can be accurately and reliably assembled, either manually or through the use of automatic machinery. The micropin connector system plug and socket housing connector components, which are described in the aforesaid prior U.S. Pat. No. 5,211,589, meet the need for such reduced size connectors. These components receive and secure the improved pin and receptacle wire terminals, respectively, which are described in that patent, and which are precision formed and secured to the ends of interconnect wires which may be used in the formation of wire harnesses.

The pin terminal for the micropin system of U.S. Pat. No. 5,211,589 is of hybrid construction; that is, it is not formed completely from sheet metal, but utilizes a solid wire nose, or pin end portion, which is secured to a harness interconnect wire by means of a formed metal body portion. The metal body portion is crimped onto the solid nose portion at its forward end, with the rearward end of the body portion being configured to receive the harness wire and to be connected to it, as by means of crimping. The use of a solid wire nose produces a better tolerance control on the diameter of the mating surface of the pin terminal than was possible with prior metal forming techniques used in forming the pin end. This provides better control of the mating forces required to interconnect components, provides an additional area of mating contact by eliminating an undulating surface and a seam on a mating surface of a pin terminal, and provides better control of alignment of the terminal pin within the connector for mating. Furthermore, the solid wire nose is more cost effective since its manufacture generates less scrap metal than does a formed sheet metal pin. In addition, the better heat dissipation of the solid pin enhances the current carrying capacity of the connector.

The forward, or distal, end of the metal body portion of the pin terminal extends over, and is crimped onto, the rearward portion of the solid wire nose to hold it firmly. The forward end of the metal body is shaped, as by folding back its distal end on itself, to produce a radial locking shoulder surface which extends 360 degrees around the circumference of the wire nose. This locking shoulder is positioned along the length of the pin in such a location as to engage a locking shoulder on a corresponding flexible locking finger in the connector housing when the pin terminal is inserted.

Because of the small tolerances in micropin connectors, a process and apparatus for assembling the above-described improved pin wire terminal is needed. Such a process must secure the solid wire pin to a formed metal body at a high speed in such a way as to ensure consistent, repeatable, and controlled fusing of the parts, using any one of a variety of conductive joining materials.

BRIEF SUMMARY OF THE INVENTION

It is therefore an object of the present invention to produce an improved pin terminal which may be used in the applications discussed above to overcome problems encountered in the prior art, and which will thereby facilitate the manufacture of smaller, more reliable connectors at a reduced manufacturing cost.

It is a further object of the invention to provide a miniature pin terminal formed from two components which are mechanically attached together in such a way that they may be automatically and continuously fed through a heating station which will bond the two components together with a conductive bond.

Briefly, the present invention is directed to a method and apparatus for assembly of a pin terminal wherein a solid wire nose portion is conductively joined to a formed metal body portion, in a manner to ensure electrical conductivity between the two components. The wire nose portion is, in one embodiment, circular in cross-section, but it will be understood that any desired cross-sectional shape may be used. For example, the nose portion may have a rectangular cross-section so that it is in the form of a blade, or it may have square, octagonal or other shapes, as may be desired for various applications. The nose portion will, for convenience, be referred to herein as a pin, but it will be understood that this term refers to nose portions of any suitable cross-sectional shape. The solid wire nose and the formed metal body may both be pre-treated with solder, or the body portion may be coated with solder and the pin formed of or coated with a material that will readily bond with solder; i.e., the pin may be pre-tinned, prior to being mechanically secured together by crimping. Thereafter, the soldered body portion and the tinned, crimped pin portion are is fed continuously through a heat source so that the solder between the pin and body is reflowed and then cooled, thereby joining the two components mechanically and forming an electrically conductive path through them to produce the pin terminal.

The process by which pin terminals are conductively joined together includes automatically feeding the pin terminal assembly, including the crimped pin and body portions, through an inductive soldering station. This is facilitated by connecting the rearward end of the metal body portion of each pin terminal to a web carrier, with the body portion being formed as a part of, or otherwise attached to the web, and with the forward end of the metal body portion being crimped onto the rearward end of the solid nose portion, or pin. As noted above, one or both of these portions are pre-soldered or tinned prior to being mechanically crimped together. After crimping, the web carrier is wound onto a first spool, and from this it is fed to an inductive soldering machine which automatically moves the terminals carried on the web from the first spool and through an inductive soldering station to a second spool. The soldering station incorporates inductive heating coils, through which the terminals are moved at a predetermined speed based on the length of the inductive heating coils in the station, the electrical current flow through the coils, and other appropriate parameters. Optionally, the temperature of the web as it goes into the soldering station and as it leaves the station can be sensed, and a feedback temperature controller can be used to appropriately adjust the heat output of the coils, as by varying the current flow and thus the strength of the inductive field, and by varying the time duration of the exposure by varying the speed at which the pin terminal is moved through the soldering station, so as to produce a desired temperature within the pin terminal for a specific length of time. Alternatively, the user can empirically establish a desired power level and speed that will produce a desired temperature in the pin terminal for a specific length of time. The connector components thus are inductively soldered together in the soldering station, by heating the connector components internally by means of the inductive field to ensure complete joining of the two parts by melting the pre-applied solder.

It will be understood that tin, gold plating or any of a number of materials which are heat settable, heat reflowable, or heat curable, and electrically conductive, may be used instead of solder and that, if desired, the components can be pre-tinned with a bonding material and a ribbon of solder supplied to the inductive soldering station for use in connecting the parts. The connector components can be fabricated out of any metal or alloy, and may be treated with any coatings or platings that the user desires, provided that appropriate bonding materials are chosen which are compatible with each other and with the parts to be joined together.

During the inductive soldering process, the heat is produced principally in the joint to be bonded. In addition, the tips of the terminal pins may be locally cooled so as to preclude the formation of intermetallics, which would change the properties and composition of the parts, and also to prevent the solder, or other bonding material, from deforming or leaking out of the precise locations desired. Additionally, the inductive coils preferably are hollow tubes which may be filled with a coolant to prevent the coils themselves from becoming hot, thereby preventing overheating of the pin terminals and preventing excessive flow of the bonding material to prevent contamination of the pin tips. By properly sizing and locating the coils, the induction heating is restricted to the desired specific areas.

BRIEF DESCRIPTION OF THE DRAWINGS

The foregoing, and additional objects, features and advantages of the present invention will become apparent to those of skill in the art from the following detailed description of preferred embodiments thereof, taken in conjunction with the accompanying drawings, in which:

FIG. 3 is a cross sectional view of the terminal of FIG. 2 taken along line 3—3 thereof;

FIG. 5 is a diagrammatic front elevation view of an apparatus for inductive soldering of electrical connector components which are attached to the web carrier of FIG. 4;

FIG. 6 is a diagrammatic representation of an inductive heater incorporating two spaced electromagnetic coils;

FIG. 7 is an enlarged detail of the apparatus of FIG. 5, illustrating an inductive soldering station utilizing the inductive heater of FIG. 6, also in front elevation;

FIG. 9 is a top view of the inductive soldering apparatus of FIG. 5;

FIG. 10 is a cross-sectional view of the inductive soldering station of FIG. 7, illustrating vertical guiding channels for positioning the pin terminals between inductive heating coils, and further illustrating a protective cover for the station viewed in the direction of arrows 10—10 of FIG. 7; and FIG. 11 is a partial side view taken along line 11—11 of FIG. 7, showing additional details of the vertical guiding channels thereof.

DESCRIPTION OF THE PREFERRED EMBODIMENT

Figure 1:
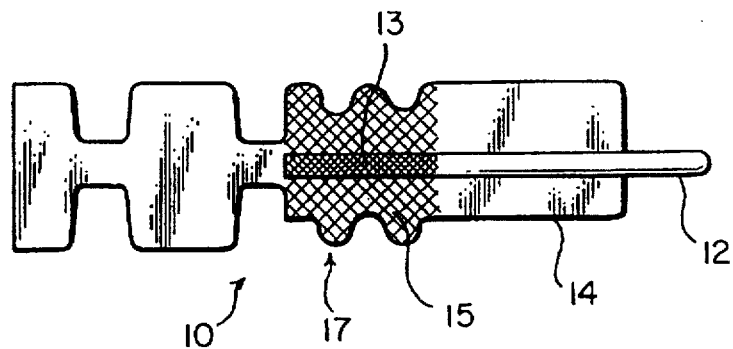
FIG. 1 illustrates a pin terminal which includes a solid wire pin portion and a metal body portion prior to forming and crimping the body, wherein each has pre-soldered or tinned in limited corresponding areas.

FIG. 1 shows a component of an electrical connector, such as the two-part pin terminal described above, which may be conductively joined using the process and apparatus constituting the present invention. Specifically, a pin terminal 10 is illustrated as being comprised of a solid wire nose portion 12, or pin, which has been coated with a suitable bonding material over at least a rearward part of its length, as at 13, and a sheet metal body portion 14 which additionally has been coated with a bonding material over at least a region 15 of the body 14 corresponding to the coated portion 13 of the pin. If desired, one of the pin or sheet metal, for example body portion 14, is coated with solder or like heat reflowable material and the other is "tinned," i.e., is coated with tin, gold, gold flash palladium, or other material which will readily bond to solder may be tinned. Preferably, the entire sheet metal body portion 14 is coated with solder for cost efficiency; additionally, for cost efficiency, the entire pin portion 12 is tinned. The pin 12 may be cut from a roll of wire which is pre-tinned.

Figure 2:
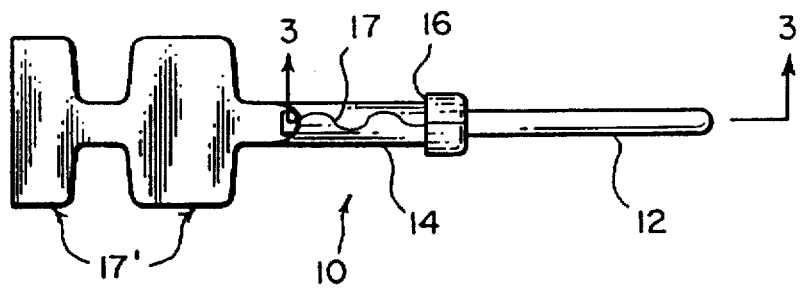
FIG. 2 is the terminal of FIG. 1 in which the nose and body portions have been mechanically crimped together as by precision forming of the metal body.

Referring now to FIG. 2, the pin terminal 10 is fabricated by folding the sheet metal body portion 14 back upon itself at its forward end, as by precision forming, to form an annular shoulder 16, as it is precision formed around pin 12. At region 17 the body portion 14 is mechanically crimped so as to firmly grip the pin 12 to assemble the terminal 10. In this configuration the terminal may then be treated with heat, approximately at region 17, causing the solder carried by the body portion, as at 15, to reflow. Thereafter it is cooled to thereby form a mechanical and electrically conductive bond between the pin 12 and the body 14. The pin terminal assembly 10 may be attached at its rearward end region 17' to any type of wire, with suitable wire retainer portions 17" of the metal body 14 being precision formed and mechanically crimped about the wire (not shown) to form a terminated wire or cable, as is well known.

Referring now to FIG. 3, a partial cross-sectional view of the pin terminal of FIG. 2 illustrates that the forward end of the metal body 14 is shaped, as by folding back its distal end on itself, to produce the annular locking shoulder surface 16 which extends radially outwardly for 360 degrees around the circumference of the wire nose, or pin 12. This locking shoulder is positioned along the length of the pin in such a location as to engage a locking shoulder on a corresponding locking finger in the connector housing when the pin terminal is inserted. The crimped solder region is indicated at 17', which is the region to be heated, as will be described.

Figure 4:
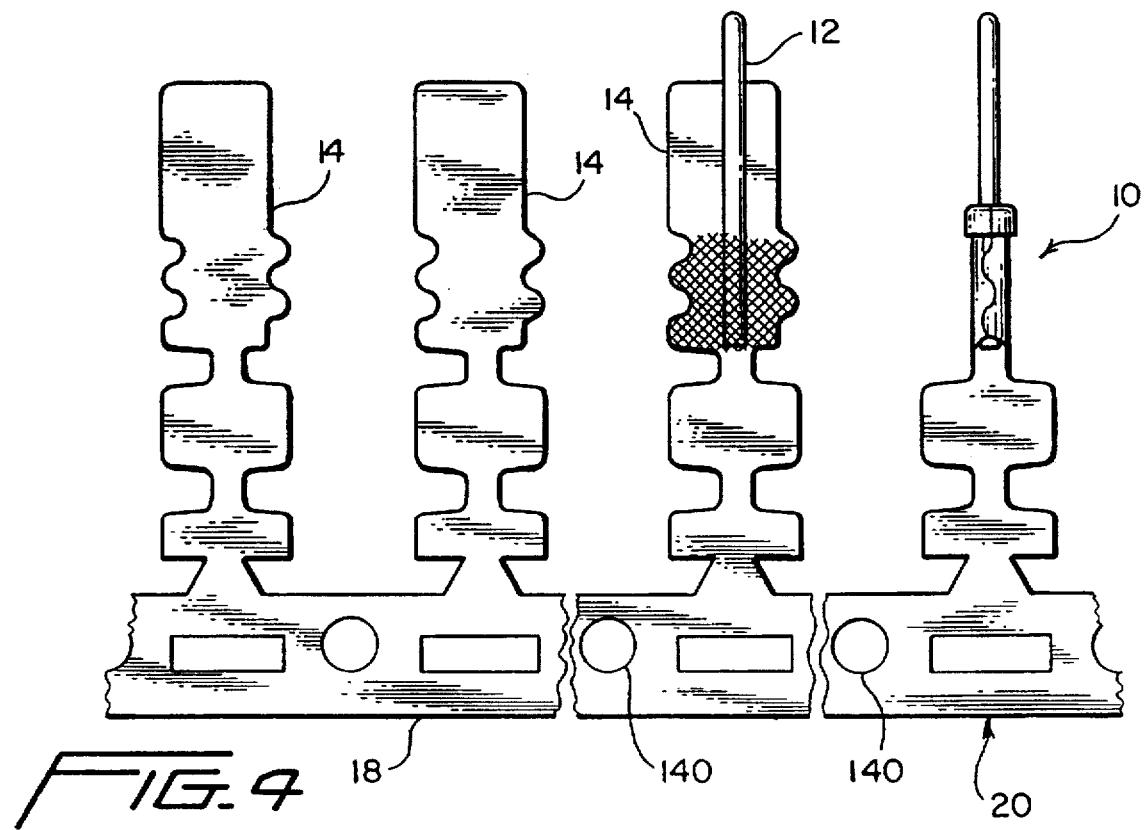
FIG. 4 shows the sheet metal body of FIG. 1, fabricated as part of, or otherwise fastened to, a web carrier which may be fed through the soldering station.

As illustrated in FIG. 4, the rearward ends of a multiplicity of sheet metal body portions 14 are formed as part of, or are otherwise fastened to, a web carrier 18. Preferably, the web and the terminal body portions are stamped from a continuous strip of metal of any desired length to form a multiplicity of adjacent terminal body portions along the length of the supporting web. Thereafter, pins 12 are secured in the free, or forward ends of the body portions 14 utilizing the tinning and crimping processes described above. In this way, a strip 20 of terminals is fabricated, and this strip is fed through subsequent stages of production, including, in accordance with the present invention, exposure to a heat source to cause the solder in the crimped regions of the terminals to reflow and conductively bond the pin to the body portion for each terminal.

Preferably, the pre-soldering of the metal body portions is carried out by coating the metal strip with solder prior to stamping the web and body portions 14. The solder coats at least the region 15 (FIG. 1) of each of the body portions 14, but preferably coats the entire surface of the strip. The pin portions 12 for the terminals preferably are cut from wire which is pre-tinned along its entire length, so that the pin portions 12 are tinned when they are positioned on the body portions 14 prior to crimping. After fabrication, the strip 20 may be wound onto a spool for storage, transportation, or integration into the induction heating machine of the present invention, illustrated in FIG. 5.

FIG. 5 illustrates a front elevation view of an induction soldering machine 30 in accordance with the present invention. The machine 30 includes a support table 40 which in turn houses a cooling unit, shown in phantom at 42, a control station 44, a supply reel 46 and receiving reel 48, a soldering station 50 surrounded by a clear protective cover 51, and support beams 52, 53, and 54. The workpiece in the present example is the strip 20 of pin terminals which is continuously fed from the supply reel 46, through the soldering station 50, and onto the receiving reel 48. The supply reel 46 is free-running, while the takeup reel 48 is driven by a small motor, illustrated in FIG. 9 at 56.

The cooling unit 42, which is housed within the support table 40, supplies cooling liquid or chilled air to induction heating coils (to be described) and cooling nozzles (to be described) in soldering station 50. This coolant both prevents the coils themselves from becoming heated and also cools the pin end portions 12 of the pin terminals 10, thereby preventing overheating of the workpiece 20 and preventing excessive flowing of the bonding material within the workpiece. Such overheating and excess flow can result in solder flowing onto the pins and deforming the surface shape so that the pins no longer will fit in connector sockets, or can result in contamination of the workpiece which might interfere with the electrical conductivity between a terminal and socket. Any of these problems would render the workpiece unacceptable.

The control station 44 includes suitable manual speed controls for the various drive motors used in the soldering machine 30, provides manual control of the current flow through the heating coils in the soldering station 50, and provides manual control of the flow of coolant. This allows the operator of the machine 30 to visually monitor the quality of the solder joint between the metal body portion 14 and the pin 12, and to regulate and balance the speed of travel of the workpiece through the soldering station with the amount of heating produced by the coils and the cooling effect of the coolant to produce consistently high quality pin terminals.

If desired, the control station 44 may provide automatic controllers for the current and voltage, and thus the power supplied to the coils in the soldering station, and for the speed of the workpiece feed. For this purpose, a suitable computer chip may be provided to control the heat generated within the workpiece in response to a feedback loop incorporating one or more a sensors responsive to the temperature of the workpiece as it enters and exits the soldering station. Such sensors may be, for example, one or more thermistors, one of which is shown at 60 in FIG. 7. The feedback loop regulates the strength of the inductive field produced by the current flow in the heating coils, the feed rate of the workpiece within the soldering station, and the flow of coolant, adjusting these parameters as needed to obtain the correct temperature within the workpiece for the desired period of time. This is accomplished, for example, by comparing the workpiece temperature where it enters and leaves the heating station, the voltage and/or current output from the power supply, and the feed rate of the workpiece to predetermined boundary conditions and limits, which may be loaded into the computer by the operator to satisfy the needs of the task at hand.

The soldering station 50, which is illustrated in greater detail in FIGS. 6–11, includes two spaced, parallel, elongated induction heating coils 62 and 63 illustrated diagrammatically in FIG. 6, and in cross section in FIG. 10. These are commercially available single turn induction heating coils, each constructed of a bent section of uncoated, hollow tubing, which is square in cross-section. Such coils are available from Inductoheat Corporation of Madison Heights, Mich. The coils 62 and 63 are mounted on a vertical support panel 64, as by means of top and bottom brackets 65 and 66 (FIG. 7). The coils are mounted in spaced-apart parallel relationship on opposite sides of, and thereby define, a heating path or region 68 for receiving the workpiece. The coils include elongated central portions 70 and 71, respectively, which extend the length of the heating region, and include upper and lower ends, such as the ends 72 and 73 of coil 62 and ends 72' and 73' of coil 63, as illustrated diagrammatically in FIG. 6.

Figure 8:
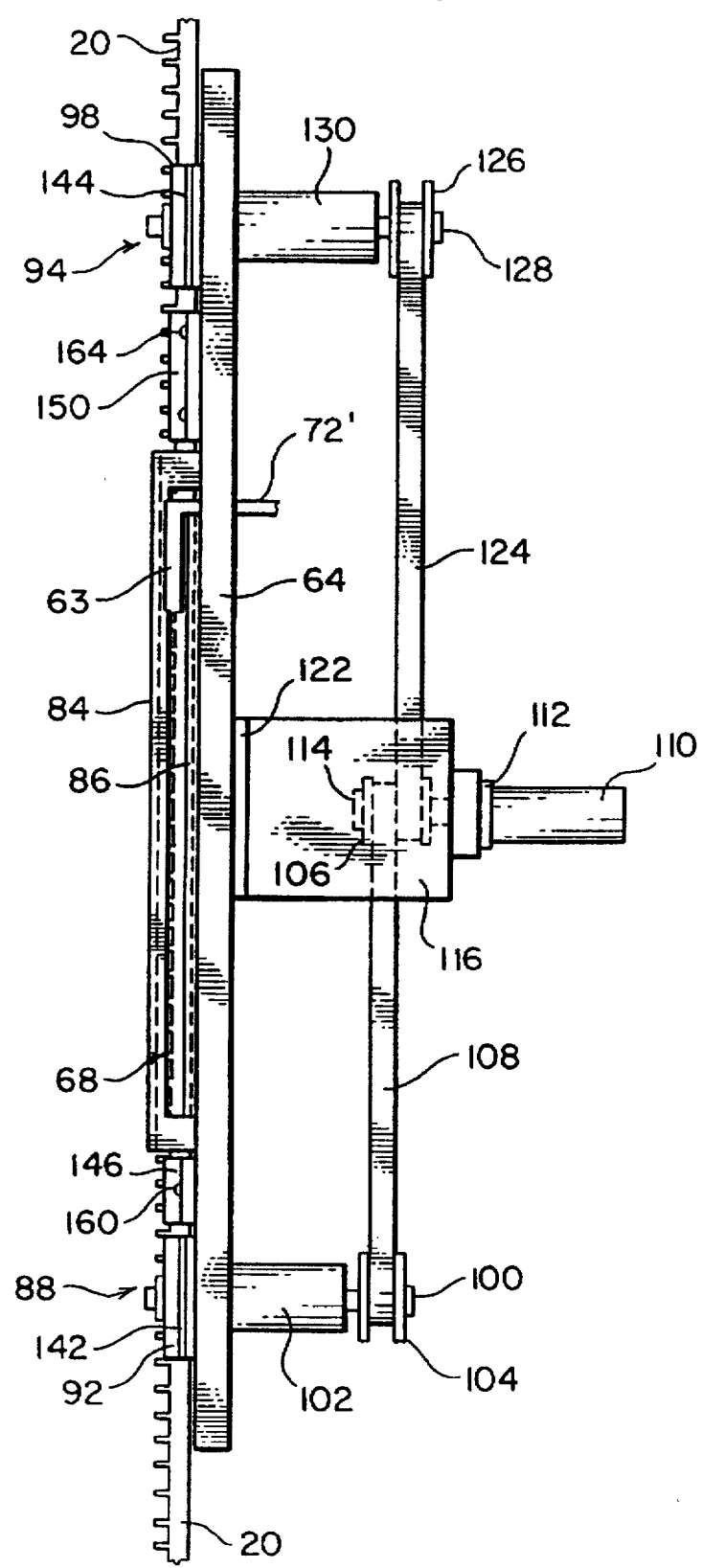
FIG. 8 is a side view of the inductive soldering station of FIG. 7, viewed in the direction of arrows 8—8 thereof.

As illustrated in FIGS. 8 and 10, the ends 72, 73 and 72', 73" extend rearwardly from the respective central portions 70 and 71 through the vertical panel 64 for connection by suitable electrically nonconductive conduits to the cooler 42. The coils preferably are internally cooled, as by a liquid coolant or by chilled air from the cooler 42 which is pumped through the conduits and the hollow centers 74 and 76, respectively, of the coils. Electrical power lines 78 and 80, respectively, connect the coils 62 and 63 to a source of electrical power which is regulated by the controller 44. When energized by the controller current flows through the two single turn coils to provide an additive electromagnetic field in the heating region 68 between the coils. The longitudinal axes of the central portions 70 and 71 are parallel and spaced apart sufficiently to enable a workpiece to pass vertically therebetween. When the workpiece is the strip 20, the plane defined by the terminals 10 and the web carrier 18 making up the strip 20 is perpendicular to a plane 83 defined by the axes of the two coils (see FIG. 10).

A pair of vertical guide channels 84 and 86 are provided along the heating region 68, in front of and behind the plane 83 as viewed in FIGS. 5 and 7 (or above and below the plane as viewed in FIG. 10), the channels serving as guides to maintain the position and alignment of the workpiece 20 as it passes through the soldering station. As illustrated in FIGS. 10 and 11, the channels are generally U-shaped with one channel, for example channel 84, receiving the pins 12 of the terminal portions of the workpiece and the other channel, for example channel 86, receiving the web carrier portion 18. The channels are so positioned as to locate the pre-tinned and crimped portions 17 of the pin terminals approximately in or closely adjacent to the plane 83 so as to concentrate the maximum inductive heating power of the coils at that location as the workpiece passes through the heating station.

The workpiece 20 is fed through the soldering station by two pairs of feed wheels mounted on panel 64 below and above the heating region 68, as best illustrated in FIGS. 7 and 8. A first, or lower pair of feed wheels is generally indicated at 88 and includes an idler 90 and a feeder 92, while a second, or upper pair of feed wheels generally indicated at 94 includes an idler 96 and a feeder 98. As illustrated in FIG. 8, the lower feeder 92 is mounted on the panel 64 by a shaft 100 secured in a bushing 102. The feeder is mounted on one end of the shaft, the opposite end of which carries a pulley 104. This pulley is coupled to a main drive pulley 106 by means of a drive belt 108, the drive pulley in turn being coupled to a drive motor 110 through a reducing gear 112 by means of a drive shaft 114. The drive pulley 106 is enclosed in a housing 116, which is attached to the rear surface of the main mounting panel 64 by way of a bracket 122.

In similar manner, the upper feeder 98 is driven by the motor 110 through the reducing gear 112 and a drive belt 124 which is also mounted on the drive pulley 106. The belt 124 is coupled to the feeder 98 by way of a pulley 126 mounted on one end of a shaft 128 positioned in a bushing 130 on panel 64, the feeder 98 being mounted on the opposite end of the shaft. The lower and upper feeders 92 and 98, respectively, are driven by the same motor 110, and are equally spaced from the drive pulley 106 so that the upper and lower driven wheels turn at substantially identical rotational speeds and thereby maintain a prescribed lengthwise preload on the workpiece 20 as it passes through the region 68. This prevents the workpiece from becoming entangled or derailed while passing between the lower feeder and idler wheels, 92 and 90, through the vertical guide channels, 84 and 86 in the soldering station, and then through the upper feeder and idler wheels 98 and 96. To further insure proper control of the feeding of the workpiece through the soldering station, the web carrier 18 may include a series of apertures 140 (FIG. 4) which may receive corresponding drive teeth on the feeders 92 and 98. In a preferred form of the invention, however, the feeders 92 and 98 employ O-ring type friction surfaces 142 and 144 to grip the carrier 18 and feed it through the soldering station.

To insure that the workpiece is guided into the channels 84 and 86 from the lower pair of feed wheels 88, a pair of guide brackets 146 and 148 are provided at the lower end of the vertical channel. Similarly, guide brackets 150 and 152 are provided at the top end of the guide channel to direct the workpiece into the nip between the upper feed wheels 94. The upper and lower guide brackets not only serve to maintain workpiece orientation, but the upper brackets also function as a heat sink to provide a cooling path for the soldered terminals.

The lower guide brackets 146 and 148 are generally L-shaped, and are secured to the main panel 64 by bolts 160 and 162, by welding, or by other similar fasteners. Similarly, the guide brackets 150 and 152 and generally L-shaped and are secured to the mounting panel 64 by bolts 164 and 166 or by other suitable fasteners.

The guide channel 86 which is behind the plane 83 as viewed in FIG. 7, (or below it as illustrated in FIG. 10) is generally U-shaped with a base portion 170 in contact with the mounting plate 64. The guide channel incorporates a central slot 176 extending the length of the channel, to receive and guide, in the preferred form of the present example, the web carrier portion 18 of the workpiece 20. A laterally extending flange 178 extends at least a portion of the length of the guide channel 86 along at least one side thereof and, as illustrated herein, preferably extends the full length of the channel. The guide channel is bolted or otherwise fastened to the mounting plate 120 at its opposite ends, as by bolts or fasteners 180 and 182 passing through the flange. A similar flange 178' and fasteners may be provided on the opposite side of the channel.

The guide channel 84, which is in front of plane 83 (or above it, as illustrated in FIG. 10), also includes a base portion, indicated at 186, with a pair of spaced legs 188 and 190 defining a central slot 192 which is opposed to slot 176 in channel 86, and which receives, in the preferred form of the invention, the terminal pin portion 12 of the workpiece 20. The guide channel 84 is suspended outwardly from panel 64 by means of suitable brackets 194 and 196 which may be integral with the leg 190 of guide channel 84 or may be fastened thereto by welding, for example, and which are secured to the face plate 64 by suitable bolts or other fasteners 200 and 202.

To insure that the pin portion 12 of the workpiece 20 is sufficiently cooled, so as to preclude the flow of solder onto the forward ends of the pins during the soldering operation, and thus to prevent contaminating the pin with beads of molten solder, a series of air nozzles, such as the nozzle shown at 210, are provided. These nozzles are connected to a manifold 212, into which chilled air is supplied through a conduit 214 which passes through the panel 64 at an opening 216 and is connected to cooler 42. The manifold, which is preferably of lightweight plastic construction, or the like, is secured by means of O-clamp brackets, such as at 218 and 220, which in turn are fastened to the panel 64 by suitable fasteners, such as bolts 222 and 224. The nozzles direct air at the pin portions 12 of the terminals on the workpiece 20 as they pass through the heating region 68, and thereby cool the pin portions sufficiently to discourage the molten solder from flowing away from the crimped area 17 of the terminal and onto the pin portion 12.

To protect the mechanisms of the soldering station 50 from dust or other contaminants, and to preclude inadvertent human contact with the working parts, the clear protective cover 51, constructed of plexiglass, for example, is attached to the support panel 64 by means of bolts or other suitable fasteners, such as at 225–228 (FIG. 7).

In operation, the workpiece 20 is fed from the supply reel 46 by the motor-driven feed wheels 88 through the guide brackets 146 and 148, and thus into the heating region 68 along a path defined by the opposed guide channels 84 and 86. The workpiece is drawn upwardly through the heating region 68 between the coils 62 and 63, and between the guide brackets 150 and 152 by the upper feed wheels 94 and is rewound on the takeup reel 48. As illustrated in FIG. 9, the takeup reel is driven by motor 56 to maintain a small amount of tension on the workpiece to thereby wind it firmly onto its reel.

As the workpiece moves through the heating region 68, the operator causes a selected current to flow through the coils 62 and 63, producing a corresponding electromagnetic field in the heating region 68 between the coils to induce current flow in the metal workpiece. This induced current heats the individual pins and their surrounding sheet metal body portions internally, causing the solder on these portions to reflow. The cooling nozzles 210 ensure that the pin ends remain cooled sufficiently to hinder the flow of molten solder out of the desired areas of reflow. The heated workpiece is then carried out of the heating region and is cooled as it passes through the guide brackets 150 and 152, so that the solder forms a mechanical and electrically conductive bond between the pin and the sheet metal body portion. The distance between the top of the heating coils 62 and 63 and the upper feed wheels 94 is sufficient to permit this cooling, but if necessary, chilled air may be directed onto the web in this region to accelerate the process.

The workpiece is sufficiently heated within the heating region 82 by proper setting of the speed of the drive motor 110 and also by proper setting of the voltage and current, and thus the power to the inductive coils. This may be done manually by an operator, or may be done automatically through the use of the feedback loop controller, as described above. In this way, the two pieces of a workpiece, such as the described solid wire pin and formed sheet metal body, can be quickly, reliably, repeatably, and efficiently bonded together to form a web of conductive pin terminals which may be detached from the web for use in wire harnesses of a miniature size such as those required by the automotive industry.

Although the present invention has been described in terms of a preferred embodiment, it will be apparent that variations and modifications may be make without departing from the true spirit and scope thereof, as set forth in the following claims.

What is claimed:

1. A method for fabricating a web of pin terminals, comprising:

precision stamping a sheet metal web to form a plurality of interconnected, integral metal body portions;

tinning at least a portion of each of said body portions with a heat-reflowable solder;

locating a pin terminal on each of said body portions;

crimping each of said body portions onto its corresponding pin terminal to bring the tinned portion into contact with the pin; and passing said web through an inductive heater to reflow said solder to fasten each body portion to its pin terminal.

2. The method of claim 1, further including winding said web onto a reel following soldering.

3. The method of claim 2, further comprising cooling said body portions before winding.

4. The method of claim 2, further comprising controlling the temperature of the web by varying the speed at which the web passes through said heater.

5. The method of claim 2, further comprising controlling the temperature of the web by varying a current supplied to said inductive heater.

6. The method of claim 1, wherein crimping each of said body portions includes forming each body portion around an end portion its corresponding pin terminal to engage and mechanically secure the pin terminal in the body portion.

7. The method of claim 6, further including:

winding said web and crimped pin terminals onto a supply reel;

feeding said web and crimped pin terminals from said supply reel to said inductive heater; and winding said web and soldered pin terminals onto a storage reel.

8. The method of claim 6, wherein passing said web through said heater includes inductively heating said solder at said tinned body portion.

9. The method of claim 8, wherein passing said web through said heater includes guiding said web through a soldering station channel to maintain a preselected spacing between said web and said inductive heater.

10. The method of claim 9, further including cooling said reflowed solder to solidify the solder and fasten said pin terminals in said body portions.

11. The method of claim 10, wherein inductively heating said solder includes:

producing a selected current in a heating coil adjacent said soldering station channel, said current producing an electromagnetic field in said channel to inductively heat said body portion and said pin terminal to reflow said solder.

12. The method of claim 11, wherein cooling said reflowed solder includes directing cooling air onto said web after the web leaves the cooling station.

13. The method of claim 12, further including controlling the reflowing of said solder.

14. The method of claim 13, wherein controlling reflowing includes regulating the speed at which said web passes through said heating station.

15. The method of claim 13, wherein controlling reflowing includes regulating the current to said heating coil The foregoing claims are added to provide the scope of protection to which applicants are believed entitled.

* * * * *

UNITED STATES PATENT AND TRADEMARK OFFICE
CERTIFICATE OF CORRECTION

PATENT NO. : 5,675,891
DATED : October 14, 1997
INVENTOR(S) : JONATHAN CHILDS, et al.

It is certified that error appears in the above-identified patent and that said Letters Patent is hereby corrected as shown below:

Column 12, cancel lines 32 and 33, which are the last two lines of the column.

Signed and Sealed this

Sixteenth Day of December, 1997

Attest:

BRUCE LEHMAN

*Attesting Officer*   Commissioner of Patents and Trademarks